United States Patent [19]

Owada

[11] 3,786,830
[45] Jan. 22, 1974

[54] OIL DRAINING VALVE FOR A COMPRESSED AIR CONTAINER

[75] Inventor: Akihito Owada, Kawaguchi, Japan

[73] Assignee: Nippon Piston Ring Kabushiki Kaisha, Tokyo, Japan

[22] Filed: July 3, 1972

[21] Appl. No.: 268,548

[30] Foreign Application Priority Data
Aug. 4, 1971    Japan .............................. 46-58328

[52] U.S. Cl. ............................... 137/204, 137/494
[51] Int. Cl. ............................................... F16t 1/14
[58] Field of Search ............................ 137/204, 498

[56] References Cited
UNITED STATES PATENTS
2,662,544   12/1953   Hall ..................................... 137/204
2,668,555   2/1954    Bartolat ............................... 137/498
3,572,845   3/1971    Johannesen ..................... 137/498 X Primary Examiner—Alan Cohan

[57] ABSTRACT

An automatic draining valve having a plate-shaped valve member spring-biased toward a position in which it defines throttling passages connecting the inlet and discharge nipples of the valve. An increased fluid pressure at the inlet nipple causes the valve member to be pressed against a seat on the discharge nipple. The valve permits a container intermittently receiving compressed air to be drained of lubricating oil while at approximately ambient pressure, while sealing the container if it receives compressed air.

8 Claims, 4 Drawing Figures

3,786,830

OIL DRAINING VALVE FOR A COMPRESSED AIR CONTAINER

This invention relates to automatic draining valves, and particularly to a valve which automatically drains liquid from a container intermittently receiving a gas under pressure without permitting escape of significant amounts of the gas.

In its more specific aspects, the invention is concerned with the release of lubricating oil from a container intermittently receiving compressed air. Unless special precautions are taken, compressed air often contains suspended droplets of lubricating oil picked up from a compressor. The oil tends to accumulate in pipes conveying the compressed gas, and particularly in containers which receive the gas under intermittent pressure only. An example of a container operating under analogous conditions is found in the mechanism for feeding air into a rotary member, such as an air-operated clutch, which has been disclosed and claimed in Kosaka U.S. Pat. No. 3,598,147. While the invention will be described hereinafter in its application to the feeding mechanism of the earlier patent, it provides a liquid draining valve suitable for other purposes wherever similar operating conditions are encountered.

The primary object of the invention thus is the provision of an automatic draining valve for automatically releasing a liquid, and only the liquid, from a container which intermittently receives a supply of a gas under elevated pressure.

In one of its more specific aspects, the invention provides a valve body having two end walls spacedly opposite in a predetermined direction and a side wall connecting the end walls, the side and end walls bounding a cavity in the valve body. A tubular valve seat member projects from one end wall into the cavity, and its bore communicates with an opening through the associated end wall. An annular face of the member opposite the other end wall constitutes a valve seat. A valve plate member engages the side wall and divides the cavity of the valve body into two compartments respectively adjacent the two end walls. An aperture in the valve body commmunicates with the compartment adjacent the other end wall in all positions of the plate member which is movable toward and away from sealing engagement with the valve seat and defines conduits which connect the two compartments. An abutment limits movement of the plate member away from the valve seat to a position in which the plate member defines at least one throttling passage with the seat member and/or the other end wall, the passage or passages and the conduits connecting the afore-mentioned opening and aperture for sequential flow of fluid through the passage or passages and the conduits between the opening and the aperture.

Other features, additional objects, and many of the attendant advantages of this invention will readily be apparent as the same becomes better understood by reference to the following detailed description of preferred embodiments when considered in connection with the appended drawing in which.

Figure 1:
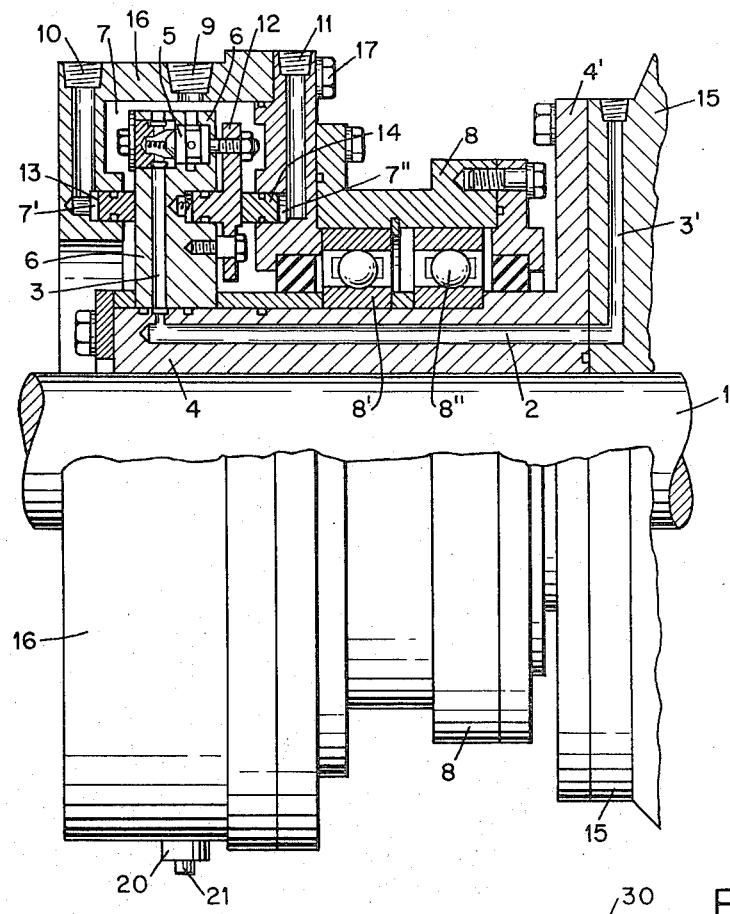
FIG. 1 shows an air feeding mechanism of the afore-mentioned earlier patent partly in section on an elevational plane, and the oil drain valve of the invention attached thereto.

Referring now to the drawing in detail, and initially to FIG. 1, there is shown the air feeding mechanism for an air operated clutch in a view corresponding to that of FIG. 1 in the commonly owned U.S. Pat. No. 3,598,147. Only as much of the clutch is seen as is needed for an understanding of the invention.

The drive shaft or input shaft 1 of the clutch is fixedly fastened to the clutch housing 15 and is enveloped by a tubular shaft 4 having an integral flange 4' fixedly fastened to the housing 15 so that the shaft 4 rotates with the shaft 1. An annular disc 6 and the inner races of two ball bearings 8', 8'' are fixedly fastened on the shaft 4 in axially spaced relationship.

The disc 6 is spacedly enveloped by an annular casing 16 having two parts fixedly connected by bolts 17. A tubular bearing box 8 which carries the outer races of the ball bearings 8', 8'' is fixedly fastened to the casing 16 so that the shaft 1 and the elements mounted thereon rotate on the ball bearings 8', 8'' relative to the casing 16 and associated stationary devices.

The disc 6 and the casing 16 bound an air chamber 7 which, in the illustrated position of the device, is sealed in a radially inward direction by two annular pistons 13, 14 respectively received in grooves 7', 7'' in opposite radial walls of the casing 16. Openings 9, 10, 11 of the casing 16 are normally connected to a compressed air line through a non-illustrated control valve. Air admitted through the opening 9 directly enters the chamber 7. Air pressure admitted through the opening 10 drives the piston 13 into sealing engagement with the rotating disc 6. Air pressure acting through the opening 11 forces the piston 14 against an annular disc 12 parallel to the disc 6 and guided axially on the disc 6 while secured against rotation. The disc 12 is spring-biased away from the disc 6 and toward the piston 14.

Radial bores 3' in the clutch housing 15 communicate with axial bores 2 in the tubular shaft 4, and the latter communicate during rotation of the shaft 1 with radial bores 3 in the disc 6, only one each of the bores 2, 3, 3' being shown in the drawing. A check valve 5 is arranged in each bore 3 normally to seal the bore from the chamber 7, and is connected to the disc 12 for admitting air from the chamber 7 to the bore 3, and thereby to the interior of the clutch housing 15 when the disc 12 is moved toward the disc 6 by the piston 14.

When it is desired to release the normally engaged clutch represented in the drawing by the housing 15 and the shaft 1 only, the non-illustrated control valve is set to connect the openings 9, 10, 11 with the compressed air line. The air-loaded piston 13 prevents escape of the air admitted to the chamber 7 through the central opening in the casing 16, and the air-loaded piston 14 similarly seals the chamber 7 and additionally shifts the disc 12 to open the check valves 5, thereby admitting operating air from the chamber 7 to the clutch housing 15. WHen the air supply is shut off, and the openings 9, 10, 11 are vented to the atmosphere, the valves 5 close and maintain air pressure in the clutch housing. If it is desired to vent the clutch, compressed air is supplied only to the opening 11, thereby causing the disc 12 to open the valves 5 and to connect the clutch housing with the atmosphere.

The structure described so far is known and more detailed information about it can be found in the earlier patent.

In operating devices of the earlier patent continuously over extending periods, it has been found that wear of the pistons 13, 14 and of the cooperating annular face portions of the discs 6, 12 requires shut-down of the apparatus for maintenance and repair work from time to time although the pistons engage the discs under air pressure only for short periods, such as 5 to 10 seconds, while air is being admitted to the clutch housing 15. It has also been found that wear can be reduced to a minimum and the intervals between one maintenance shut-down and the next can be lengthened greatly by mixing small amounts of lubricating oil with the compressed air supplied. However, no conventional drain valve was found which would permit the oil unavoidably accumulating at the lowest point of the stationary casing 16 to be released in a satisfactory manner before the oil interferes with operation of the check valves 5. With all available drain valves, enough compressed air was released together with the oil to atomize the latter as it leaves the casing 16 and thereby to foul the atmosphere near the clutch. The loss of compressed air also was greater than is permissible.

This invention is more specifically concerned with an automatic oil drain valve whose body portion 20 and discharge nipple 21 appear in FIG. 1 at the lowest point of the casing 16.

Figure 2:
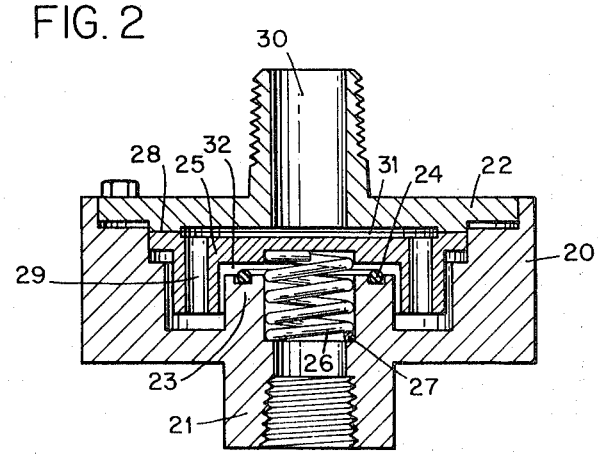
FIG. 2 shows the drawin valve of FIG. 1 on a larger scale and in section on the same elevational plane.

As is better seen in FIG. 2, the lower portion 20 of the valve body has the approximate shape of a shallow cup of circular cross section about a vertical axis, the discharge nipple 21 being integral with the body portion 20 and coaxially projecting from the radial bottom end wall of the same. The open top of the body portion 20 is closed by a cover 22 which provides the other radial end wall for the cavity in the valve body and is bolted to the axial side wall of the cup shape.

A tubular valve seat member 23 integral and coaxial with the nipple 21 projects from the bottom wall of the body portion 20 toward the cover 22, and its radial annular end face is provided with a partly recessed sealing ring 24 to provide a valve seat for a generally plate-shaped valve member 25. One end of a helical compression spring 26 is seated on a shoulder 27 in the communicating bores of the seat member 23 and the nipple 21, and the other end of the spring is received in a shallow recess on the underside of the valve member 25 to bias the valve member toward the illustrated position in which it abuttingly engages an annular projection 28 on the underside of the cover 22.

The circumference of the valve member 25 engages the axial side wall of the valve chamber in the cavity of the latter, and thus divides the cavity into two compartments connected by relatively wide tubular conduits 29 depending from the valve member 25 into the annular portion of the valve cavity between the seat member 23 and the side wall. An inlet nipple 30 projecting from the cover 22 coaxially with the nipple 21 is normally threaded into an opening of the casing 16 similar to and diametrically opposite the opening 9.

Oil may thus flow from the chamber 7 in the casing 16 through the nipple 30 into the valve body 20, 22 as long as the air pressure in the chamber is not substantially higher than atmospheric pressure. The oil trickles through the narrow throttling passage 31 between the lower horizontal face of the cover 22 and the parallel upper face of the valve member 25, through the conduits 29, and through another narrow throttling passage 32 between the lower horizontal face of the valve member 25 and the sealing ring 24. It is utilimately permitted to drip from the discharge nipple 21 into a non-illustrated receptacle or may be connected to such a receptacle through a tube threaded into the nipple 21.

When air under pressure is admitted to the chamber 7, only a small part of the minimal amount of lubricating oil present in the valve body at any one time is blown out of the nipple 21, but the throttling effect of the passages 31, 32, whose flow section is smaller than that of the conduits 29, quickly builds up a sufficient pressure differential between the two horizontal faces of the valve member 25 to overcome the spring 26 and sealingly to engage the valve member 25 with the valve seat member 23. The valve is not opened again until the chamber 7 is vented to the atmosphere so that oil flow from the chamber is again due to gravity only.

Figure 3:
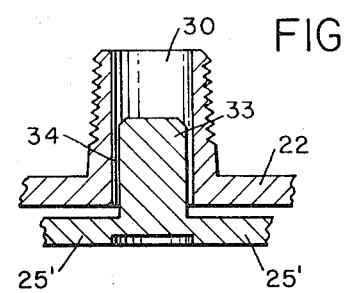
FIGS. 3 and 4 illustrate respective modifications of the valve of FIG. 2 in fragmentary sectional views on the same plane.

In the modified drain valve partly illustrated in FIG. 3, and identical with the devide of FIG. 2 as far as not illustrated, the valve member 25' carries a generally cylindrical, integral plug 33 which extends into the bore of the inlet nipple 30 and is dimensioned to bound another, annular throttling passage 34 with the inner wall of the nipple 30.

Figure 4:
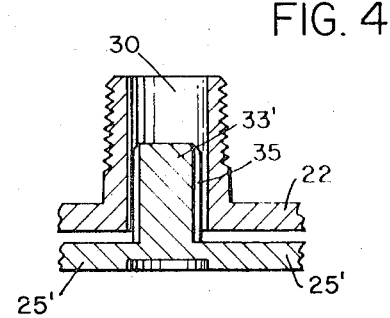

If the viscosity of the lubricating oil employed is relatively high, it may clog the annular passage 34 of the device shown in FIG. 3 by capillary action, and the further modification seen in FIG. 4 is preferred in such an instance. The plug 33' on the valve member 25' seen in FIG. 4 is provided with axial grooves 35 in its circumference which form a plurality of communicating throttling passages having individual transverse dimensions greater than that of the passage 34, yet without having a significantly increased combined flow section.

Other modifications and variations in the illustrated oil drain valve will readily suggest themselves to those skilled in the art, and it will be appreciated that the valve is not limited in its application to the apparatus of the earlier patent for which it was originally developed. It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claim.

What is claimed is:

1. A liquid draining valve for a container intermittently receiving a compressed gas comprising, in combination:
    a. a valve body having two end walls spacedly opposite in a predetermined direction and a side wall connecting said end walls.
        1. said walls jointly bouding a cavity in said body;
    b. a tubular valve seat member projecting from one of said end walls into said cavity in said direction,
        1. said one wall being formed with an opening therethrough communicating with the bore of said member,
        2. an annular face of said member opposite the other end wall constituting a valve seat;
    c. a valve plate member engaging said side wall and dividing said cavity into two compartments respectively adjacent said end walls, 1. said valve body being formed with an aperture communicating with the compartment adjacent said other end wall in all positions of said plate member,
2. said plate member being movable toward and away from sealing engagement with said valve seat and defining conduit means connecting said compartments;

d. abutment means limiting movement of said plate member away from said valve seat to a position in which said plate member defines throttling passages with said seat member and said other end wall, said passages and said conduit means connecting said opening and said aperture for sequential flow of fluid through said passages and said conduit means between said opening and said aperture; and e. yieldably resilient means biasing said plate member toward said position and away from said valve seat.

2. A valve as set forth in claim 1, wherein the effective flow section of said conduit means is greater than the effective flow section of each of said throttling passages.

3. A valve as set forth in claim 1, wherein said plate member and said seat member are formed with respective spring seats, said yieldably resilient means including a compresion spring interposed between said spring seats.

4. A valve as set forth in claim 3, wherein the spring seat of said seat memer is located in said bore of the seat member.

5. A valve as set forth in claim 1, wherein said aperture is formed in said other end wall.

6. A valve as set forth in claim 5, wherein said side wall is of substantially circular cross section about an axis extending in said predetermined direction and common to said aperture, to said opening, and to said bore.

7. A valve as set forth in claim 5, further comprising a plug member extending from said valve member into said aperture, said plug member and said other end wall defining yet another throttling passage therebetween in said aperture.

8. A valve as set forth in claim 7, wherein said plug member is formed with grooves therein elongated in said predetermined direction and open toward said end wall in said aperture, said grooves consituting portions of said yet another throttling passage.

* * * * *